No. 697,621. Patented Apr. 15, 1902.
E. GREENE.
PNEUMATIC VEHICLE TIRE.
(Application filed Jan. 4, 1902.)
(No Model.)

Witnesses
Edgeworth Greene
Inventor
By his Attorney

UNITED STATES PATENT OFFICE.

EDGEWORTH GREENE, OF MONTCLAIR, NEW JERSEY, ASSIGNOR, BY MESNE ASSIGNMENTS, TO THE AMERICAN RUBBER WORKS COMPANY, A CORPORATION OF NEW JERSEY.

PNEUMATIC VEHICLE-TIRE.

SPECIFICATION forming part of Letters Patent No. 697,621, dated April 15, 1902.

Application filed January 4, 1902. Serial No. 88,371. (No model.)

*To all whom it may concern:*

Be it known that I, EDGEWORTH GREENE, a citizen of the United States, residing at Montclair, in the county of Essex and State of New Jersey, have invented a new and useful Improvement in Pneumatic Vehicle-Tires, of which the following is a specification.

This invention relates to pneumatic rubber tires for vehicles, and has for its object to provide a tire that will yield under the wheel-rim without being cut by the rim edge. It also has for its object to so construct the body of the tire that its resiliency and resistance to compression will be graduated, so as to be alike under various loads, as will be hereinafter explained.

Figure 1:
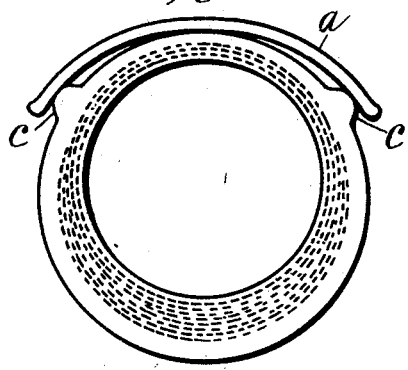
Figure 2:
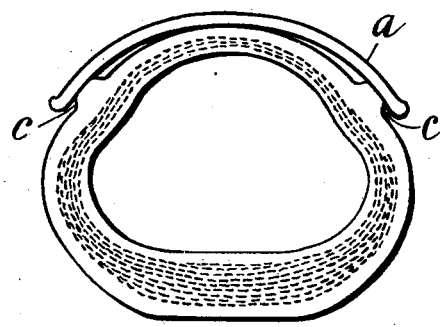
Figure 3:
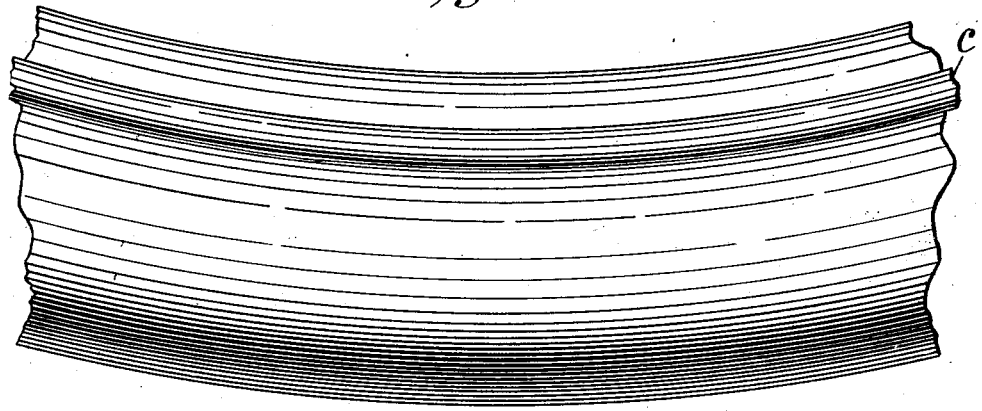

In the accompanying drawings, which form a part of this specification, my invention is fully illustrated with similar letters of reference to indicate corresponding parts, as follows:

Figure 1 represents a transverse section of my improved tire fitted to the wheel-rim $a$. Fig. 2 also represents a transverse section showing the tire compressed under a load. Fig. 3 represents a sectional side elevation, and Fig. 4 represents a transverse section showing the ordinary tire compressed under a load.

The principal feature of this invention is to prevent rim-cutting and at the same time form a lateral thrust-resisting rib on the upper side of the tire which takes effect immediately under the edge of the rim to prevent rolling out or displacement of the tire. To accomplish this, a rib $c$ is formed on each side extending entirely around the tire at a position which will bring it in contact with the under side of the rim directly under its edge, as shown in Figs. 1 and 2. The rubber forming the ribs $c$ may be made sufficiently hard to prevent the tire from rolling at all, which is quite desirable on heavy vehicles; but on light carriage-tires to obtain the best results it is preferable to form the ribs $c$ of soft yielding rubber that will compress under a load as the tire is compressed, so as to give greater resiliency to the tire and graduate its thrust resistance, as shown in Fig. 4. This feature will be readily appreciated when it is considered that in the ordinary method of making the tire to fit the rim the distance of lateral expansion in the side of the tire extends only from the edge of the rim to the center of the tire on the tread side, while a tire provided with my improved lateral thrust-ribs, constructed of soft rubber and leaving a non-contacting space between the ribs and the upper center of the tire on the rim side, creates a distance for lateral expansion in the side of the tire extending from its center at the top or rim side to its center on the tread side, thus leaving the entire side of the tire for a graduated lateral expansion and resiliency instead of one-half the side, as in the usual case, and without its being in danger of rim-cutting from side rim-pressure. Therefore the resiliency and life of the tire are greatly increased.

Figure 4:
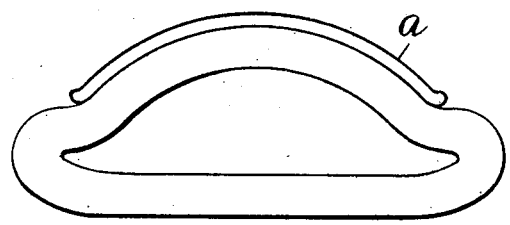

The lateral thrust-ribs $c$ being located on the upper side of the tire directly under the edge of the wheel-rim $a$ will carry a greater part of the load and prevent the edges of the rim from coming in contact with the side of the tire to cut it when compressed, as shown in Fig. 2, while with the usual method of making the tire round to fit the rim the greatest pressure is carried on the edge of the rim every time the tire is expanded laterally by tread-pressure, and as this is continuous at the point where the tire carries the load the sides of the tire are being constantly cut, as illustrated in Fig. 4.

Having thus described my invention, what I claim, and desire to secure by Letters Patent of the United States, is, to wit:

1. A pneumatic rubber tire provided with lateral thrust-weight-carrying ribs, projecting from its sides, said ribs being located in a position to carry a part of the load and to receive the lateral thrust of the tire directly under the edges of the wheel-rim, leaving a non-contacting space between the upper side of the said rib and the top center of the tire substantially as described.

2. A pneumatic rubber tire provided with lateral thrust-weight-carrying ribs, $c$, located one on each side of the tire directly under the edge of the wheel-rim leaving a non-contacting space between the upper side of the said rib, and the top center of the tire, said ribs constructed of soft yielding rubber to permit of compression under the wheel-rim, thereby creating a greater lateral expansion in the tire substantially as described.

3. The combination of a wheel-rim with a pneumatic tire provided with projecting longitudinal weight-carrying ribs, c, one on each side leaving a non-contacting space between the said ribs and the top center of the tire, the rim being so formed as to rest on the upper center of the tire and the two weight-carrying ribs, the latter preventing the edge of the rim from coming in contact with the side of the tire when compressed substantially as described.

In testimony that I claim the foregoing specification I do hereby set my hand this 30th day of December, 1901.

EDGEWORTH GREENE.

In presence of—
E. G. DUVALL,
GEO. H. SANFORD.